United States Patent [19]
Mori et al.

[11] Patent Number: 5,176,781
[45] Date of Patent: Jan. 5, 1993

[54] PROCESS FOR PRODUCING FIBER-RUBBER COMPOSITE

[75] Inventors: Osamu Mori, Kamakura; Hiroshi Hisaki; Motofumi Oyama, both of Yokosuka; Kiyomori Ohura, Kamakura, all of Japan

[73] Assignee: Nippon Zeon Co., Ltd., Tokyo, Japan

[21] Appl. No.: 647,342

[22] Filed: Jan. 29, 1991

[30] Foreign Application Priority Data

Jan. 30, 1990 [JP] Japan ................................. 2-19889

[51] Int. Cl.$^5$ ................................................ C09J 5/04
[52] U.S. Cl. ................................. 156/315; 156/331.2; 156/910; 427/407.1; 428/395; 524/501
[58] Field of Search ............ 427/407.1; 428/395; 524/501; 156/331.2, 315, 910

[56] References Cited

U.S. PATENT DOCUMENTS

| | | |
|---|---|---|
| 3,964,950 | 6/1976 | Boles ............................. 428/395 |
| 4,251,409 | 2/1981 | Neubert . |
| 4,285,850 | 8/1981 | Neubert . |
| 4,289,683 | 9/1981 | Neubert . |
| 4,300,972 | 11/1981 | Neubert . |

FOREIGN PATENT DOCUMENTS

| | | |
|---|---|---|
| 165275 | 6/1954 | Australia ......................... 156/315 |
| 0285094 | 5/1988 | European Pat. Off. . |
| 0381457 | 8/1990 | European Pat. Off. . |
| 55-142635 | 11/1980 | Japan . |
| 2-178305 | 7/1990 | Japan . |

*Primary Examiner*—John J. Gallagher
*Attorney, Agent, or Firm*—Sherman & Shalloway

[57] ABSTRACT

A process for producing a fiber-rubber composite comprising:

a polyester fiber treated with (1) an adhesive composition (AR) consisting mainly of a latex (A) of a vinylpyridine-conjugated diene type copolymer containing a vinylpyridine unit in an amount of not less than 20% by weight but not more than 70% by weight and a resorcinol-formaldehyde resin and then with (2) an adhesive composition (BR) consisting mainly of a latex (B) of a nitrile group-containing highly saturated copolymer rubber having an iodine value of 120 or less obtained by emulsion polymerization or by emulsion polymerization followed by hydrogenation in the emulsion state and a resorcinol-formaldehyde resin, and a nitrile group-containing highly saturated copolymer rubber having an iodine value of 20 or less, which process comprises bonding said polyester filber and said nitrile group-containing highly saturated copolymer rubber having an iodine value of 20 or less, by vulcanizing by a peroxide vulcanizing system.

15 Claims, No Drawings

PROCESS FOR PRODUCING FIBER-RUBBER COMPOSITE

The present invention relates to a process for producing a fiber-rubber composite. More particularly, the present invention relates to a process for producing a composite between a polyester fiber and a nitrile group-containing highly saturated copolymer rubber of low iodine value.

A fiber-rubber composite is used in automobile timing belts, polyribbed belts, conveyer belts, hoses, diaphragms, etc. As the rubber for such a composite, there has conventionally been used an oil-resistant acrylonitrile-butadiene copolymer rubber (NBR); however, a nitrile group-containing highly saturated copolymer rubber having heat resistance and oil resistance has come to be widely used recently.

The present inventors had previously found that a composite between polyester fiber and nitrile group-containing highly saturated copolymer rubber, excellent in initial adhesion strength and heat-resistant adhesion strength can be produced by subjecting a polyester fiber before making into said composite, first to a treatment with an adhesive composition consisting mainly of a latex of a vinylpyridine-conjugated diene type copolymer containing a vinylpyridine unit in an amount of not less than 20% by weight but not more than 70% by weight and a resorcinol-formaldehyde resin, and then to a treatment with an adhesive composition consisting mainly of a latex of a nitrile group-containing highly saturated copolymer rubber having an iodine value of 120 or less and a resorcinol-formaldehyde resin (Japanese Patent Application No. 21998/1989), which corresponds to EPA 381,457, filed Jan. 30, 1990.

The present inventors made further study on a composite between polyester fiber and nitrile group-containing highly saturated copolymer rubber and consequently found that the use of a nitrile group-containing highly saturated copolymer rubber of low iodine value in said composite gives a composite of excellent heat resistance and weather resistance and further that the composite produced from a polyester fiber treated with the above-mentioned two adhesive compositions and a nitrile group-containing highly saturated copolymer rubber had different properties depending upon the type of vulcanizing system used in production of the composite. The present invention has been completed based on the above finding.

According to the present invention, there is provided a process for producing a polyester fiber-rubber composite comprising:

a polyester fiber treated with 1 an adhesive composition (AR) consisting mainly of a latex (A) of a vinylpyridine-conjugated diene type copolymer containing a vinylpyridine unit in an amount of not less than 20% by weight but not more than 70% by weight and a resorcinol-formaldehyde resin and then with (2) an adhesive composition (BR) consisting mainly of a latex (B) of a nitrile group-containing highly saturated copolymer rubber having an iodine value of 120 or less obtained by emulsion polymerization or by emulsion polymerization followed by hydrogenation in the emulsion state and a resorcinol-formaldehyde resin, and a nitrile group-containing highly saturated copolymer rubber of low iodine value, which process comprises bonding said polyester fiber and said nitrile group-containing highly saturated copolymer rubber having an iodine value of 20 or less, by vulcanizing by a peroxide vulcanizing system.

In the latex (A) of a vinylpyridine-conjugated diene type copolymer used in the present invention, the copolymer constituting the latex (A) can be any vinylpyridine-conjugated diene type copolymer as long as it contains a vinylpyridine unit in an amount of not less than 20% by weight but not more than 70% by weight. However, in view of the adhesion strength, the copolymer preferably contains a vinylpyridine unit in an amount of 25-60% by weight and a conjugated diene unit in an amount of 40-75% by weight. The copolymer may contain other monomer unit(s) in amount(s) of not more than 40% by weight, as long as the meritorious effects of the present invention are not impaired.

The conjugated diene used in the synthesis of the latex (A) is not particularly restricted and its specific examples include aliphatic conjugated dienes such as 1,3-butadiene, isoprene, 2,3-dimethyl-1,3-butadiene, 1,3-pentadiene and halogen-substituted butadienes. These conjugated dienes can be used singly or in combination of two or more.

The vinylpyridine used in the synthesis of the latex (A) is desirably 2-vinylpyridine. However, 2-vinylpyridine may be partially or wholly replaced by at least one of 3-vinylpyridine, 4-vinylpyridine, 2-methyl-5-vinylpyridine, 5-ethyl-2-vinylpyridine, etc.

As the monomer(s) copolymerizable with the conjugated diene and vinylpyridine, there can be mentioned, for example, aromatic vinyl compounds such as styrene, α-methylstyrene, 2-methylstyrene, 3-methyl-styrene, 4-methylstyrene, 2,4-diisopropylstyrene, 2,4-dimethylstyrene, 4-tert-butylstyrene, 5-tert-butyl-2-methylstyrene, monochlorostyrene, dichlorostyrene, monofluorostyrene, hydroxymethylstyrene and the like; unsaturated carboxylic acids such as acrylic acid, methacrylic acid, crotonic acid, cinnamic acid, itaconic acid, fumaric acid, maleic acid, butenetricarboxylic acid and the like; unsaturated monocarboxylic acid esters such as methyl acrylate, ethyl acrylate, methyl methacrylate and the like; unsaturated dicarboxylic acid esters such as ethyl itaconate, butyl fumarate, butyl maleate and the like; unsaturated sulfonic acids and their salts such as sodium salt of sulfoethyl acrylate, sodium salt of sulfopropyl methacrylate, acrylamido-propanesulfonic acid and the like; and aliphatic vinyl compounds such as ethylene, propylene, acrylonitrile, vinyl chloride and the like. These compounds can be used singly or in combination of two or more.

The vinylpyridine-conjugated diene type copolymer can be produced usually be emulsion polymerization but may be produced by other method. The method of monomers addition in polymerization is not particularly restricted, either. In one method, all monomers are fed into a polymerization vessel in one portion to effect polymerization in one stage; in another method, part of the monomers is polymerized and then the rest of the monomers is added in one portion to continue polymerization (in this method, the polymerization is effected in two stages); in still another method, part of the monomers is polymerized and then the rest of the monomers is added continuously or intermittently to effect polymerization.

The latex (A) can be directly produced by emulsion polymerization, or can be produced by subjecting an organic solution of a copolymer obtained by other polymerization method, to phase inversion.

The nitrile group-containing highly saturated copolymer rubber constituting the latex (B) used in the present invention is not particularly restricted as long as it is a nitrile group-containing copolymer rubber having an iodine value of 120 or less, preferably 100 or less in view of the initial adhesion strength. However, there is ordinarily used a copolymer rubber containing an α,β-ethylenically unsaturated nitrile unit in a amount of 10-50% by weight, a conjugated diene unit in an amount of 30-90% by weight and an ethylenically unsaturated monomer unit in an amount of 0-20% by weight.

Such a nitrile group-containing highly saturated copolymer rubber may be obtained directly as a copolymer having an iodine value of 120 or less, or may be obtained by hydrogenating a nitrile group-containing copolymer rubber of high iodine value (e.g. a copolymer prepared using a large amount of a conjugated diene).

The α,β-ethylenically unsaturated nitrile used in the synthesis of the latex (B) can be any as long as it has a nitrile group and polymerizable unsaturated bond(s), and its specific examples include acrylonitrile and methacrylonitrile.

As the conjugated diene, there can be used the same conjugated dienes as used in the synthesis of the latex (A).

The ethylenically unsaturated monomer includes unsaturated carboxylic acids such as acrylic acid, methacyrlic acid, itaconic acid, maleic acid and the like, as well as their salts; esters of said unsaturated carboxylic acids, such as methyl (meth)acrylate, ethyl (meth)acrylate, butyl(meth)acrylate, 2-ethylhexyl(meth)acrylate trifluoroethyl (meth)acrylate, tetrafluoropropyl (meth)acrylate, ethyl itaconate, butyl fumarate, butyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate and the like; (meth)acrylamide; N-substituted (meth)acrylamides such as N-methylol(meth)acrylamide, N,N'-dimethylol(meth)acrylamide, N-ethoxymethyl(meth)acrylamide and the like; fluoroalkyl vinyl ethers such as fluoroethyl vinyl ether and the like; vinylpyridine; and so forth. There may be further used, as a comonomer, a copolymerizable antioxidant such as N-(4-anilinophenyl) (meth)acrylamide, N-4-anilinophenyl)cinnamamide, N-(4-anilinophenyl)crotonamide, N-(4-anilinophenyl)amino-2-hydroxypropyl (meth)allyl ether, 5-N-(4-anilinophenyl)amino-2-hydroxypentyl (meth)acrylate, 2-N-(4-anilinophenyl)aminoethyl (meth)acrylate, N-[4-(methylanilino)phenyl](meth)acrylamide, N-(4-anilinophenyl)maleinimide, N-[4-(methylanilino)phenyl]maleinimide, N-phenyl-4-(3-vinylbenzyloxy)aniline, N-phenyl-4-(4-vinylbenzyloxy)aniline or the like. In the present invention, the ethylenically unsaturated monomer further includes non-conjugated dienes such as vinylnorbornene, dicyclopentadiene, 1,4-hexadiene and the like.

Specific examples of the nitrile group-containing highly saturated copolymer rubber include hydrogenation products of butadiene-acrylonitrile copolymer rubber, isoprene-butadiene-acrylonitrile copolymer rubber, isoprene-acrylonitrile copolymer rubber, etc.; butadienemethyl acrylate-acrylonitrile copolymer rubber, butadieneacrylic acid-acrylonitrile copolymer rubber, etc. and their hydrogenation products; and butadiene-ethyleneacrylonitrile copolymer rubber, butyl acrylate-ethoxyethyl acrylate-vinyl chloroacetate-acrylonitrile copolymer rubber, butyl acrylate-ethoxyethyl acrylate-vinylnorbornene-acrylonitrile copolymer rubber, etc.

The latex (B) is produced by emulsion polymerization. When the nitrile group-containing copolymer rubber constituting a latex produced by emulsion polymerization has an iodine value of more than 120, the copolymer rubber is hydrogenated so that the rubber after hydrogenation has an iodine value of 120 or less. This hydrogenation must be effected for the latex obtained by emulsion polymerization. When the copolymer rubber constituting a latex produced by emulsion polymerization has an iodine value of 120 or less, the latex can be used in the present invention as it is; however, it may be subjected to hydrogenation as necessary.

It is also known to obtain a latex of a nitrile group-containing highly saturated copolymer rubber by subjecting an organic solvent solution of said copolymer rubber to phase inversion. However, the object of the present invention cannot be attained with the latex obtained by this method. When a low-saturated copolymer rubber is hydrogenated in a solution state to obtain a nitrile group-containing highly saturated copolymer rubber, the obtained rubber must be subjected to phase inversion to obtain its latex; therefore, the object of the present invention cannot be attained with this latex, either.

The hydrogenation of the nitrile group-containing copolymer rubber in a latex state is not particularly restricted; and it can be effected by, for example, the method described in Japanese Patent Application No. 334831/1988 (Japanese Laid-Open Patent Publication No. 178305/1990).

The emulsion polymerization for obtaining the latex (B) can be effected by a conventionally known method. That is, it can be effected batchwise, semibatchwise or continuously, and neither polymerization temperature nor pressure is restricted.

The emulsifier used in polymerization is not restricted, either; however, an anionic surfactant, particularly an anionic surfactant of fatty acid type is preferred. The amount of the emulsifier used is not particularly restricted; however, it is 1-10% by weight, preferably 2-6% by weight based on the total monomers, in view of the adhesion strength of the adhesive composition obtained with the resulting latex.

The polymerization initiator, molecular weight modifier and other additives used in polymerization can be those ordinarily used.

It is possible to add to the latex obtained, an antioxidant, a pH-adjusting agent, etc. as necessary.

The adhesive compositions (AR) and (BR) used in the present invention consist mainly of the latex (A) and a resorcinol-formaldehyde resin and the latex (B) and a resorcinol-formaldehyde resin, respectively. In the adhesive composition (AR) or (BR) used in the present invention, the amount of the resorcinol-formaldehyde resin is 10-180 parts by weight (as dried) per 100 parts by weight (as solid) of the latex (A) or (B).

The resorcinol-formaldehyde resin used in the present invention can be conventionally known resin, for example, the resin disclosed in Japanese Laid-Open Patent publication No. 142635/1980, and has no particular restriction. In order to increase its adhesion strength, it can be used in combination with 2,6-bis(2,4-dihydroxyphenyl-methyl)-4-chlorophenol, isocyanate, blocked isocyanate, ethylene urea, polyepoxide, modified polyvinyl chloride resin or the like.

In the present invention, part of the latex in the adhesive composition (AR) and/or (BR) can be replaced by at least one latex selected from styrene-butadiene copolymer rubber latex and modified latex thereof, acrylonitrile-butadiene copolymer rubber latex and modified latex thereof, natural rubber latex, etc. as long as the scope of the present invention is not impaired.

The polyester fiber used in the present invention has no particular restriction as long as it is a linear high molecular polyester composed mainly of polyethylene terephthalate. As the examples, there can be mentioned polyester fibers disclosed in Japanese Patent Publication No. 50184/1982, etc. which corresponds to U.S. Pat. No. 4,251,409 etc. These polyester fibers are ordinarily used in the form of thread, cord, continuous filament, cloth or the like, and may also take other form.

In the present invention, the polyester fiber is treated first with the adhesive composition (AR) and then with the adhesive composition (BR).

The methods for treating the polyester fiber with these adhesive compositions have no particular restriction, and there can be used the same methods as for known resorcinol-formaldehyde resin/polymer latex type adhesive compositions. An example of the methods is described. A polyester fiber is first dipped in an adhesive composition (AR), dried as necessary, and heated. The heating conditions are not particularly restricted. The heating is effected at such a time and temperature as the adhesive composition adhered to the polyester fiber by dipping is reacted and fixed sufficiently, and it is effected usually at about 140°–about 250° C. for several minutes. The resulting fiber is then dipped in an adhesive composition (BR), dried as necessary, and heated. The conditions are the same as in the treatment with the adhesive composition (AR). It is possible that prior to the above dipping treatments, the polyester fiber be dipped in an isocyanate compound solution, an epoxy compound dispersion or their mixture and then dried. The drying temperature employed in this case is desirably the same as or lower than the drying temperature employed after dipping in the adhesive compositions.

In the present invention, the total amount of the adhesive compositions adhered to the polyester fiber is not particularly restricted; however, it is usually 2–20% by weight, preferably 3–10% by weight based on the polyester fiber. The ratio of the amount (as solid) of the adhesive composition (AR) to the amount (as solid) of the adhesive composition (BR) is not particularly restricted, either; however, it is usually 50:50 to 80:20.

The thus obtained polyester fiber is bonded to the nitrile group-containing highly saturated copolymer rubber of low iodine value by vulcanizing by using a peroxide vulcanizing system.

The nitrile group-containing highly saturated copolymer rubber (hereinafter referred to as adherend rubber, in some cases) used in the present invention for making a composite with the polyester fiber can be a copolymer rubber between $\alpha,\beta$-ethylenically unsaturated nitrile and conjugated diene and/or ethylenically unsaturated monomer, or its derivative. The content of the nitrile group-containing monomer unit in the adherend rubber is usually 10–60% by weight in view of the oil resistance of the resulting polyester fiber-rubber composite. (The iodine value of the adherend rubber is 20 or less.) When the iodine value is more than 20, the resulting composite has low heat resistance and weather resistance. In synthesizing the adherend rubber, there can be used the same monomers as used in the synthesis of the above-mentioned latex of a nitrile group-containing highly saturated copolymer rubber.

The adherend rubber can be obtained as it is, directly by copolymerizing the individual monomers. It can also be obtained by hydrogenating a nitrile group-containing unsaturated copolymer rubber. The polymerization method and hydrogenation method for obtaining the adherend rubber are not particularly restricted. As specific examples of the adherend rubber, there can be mentioned highly saturated butadiene-acrylonitrile copolymer rubber, highly saturated isoprene-butadiene-acrylonitrile copolymer rubber, highly saturated isoprene-acrylonitrile copolymer rubber, highly saturated butadiene-methyl acrylate-acrylonitrile copolymer rubber, highly saturated butadiene-acrylic acid-acrylonitrile copolymer rubber, highly saturated butadiene-ethylene-acrylonitrile copolymer rubber, and butyl acrylate-ethoxyethyl acrylate-vinylnorbornene-acrylonitrile copolymer rubber.

In the present invention, it is necessary that the nitrile group-containing highly saturated copolymer rubber and the polyester fiber be bonded by vulcanization with a peroxide vulcanizing system. When there is used a sulfur vulcanizing system, it is impossible to attain the present object of obtaining a composite of high adhesion strength.

The peroxide usable in the present invention has no particular restriction and can be a peroxide ordinarily used in vulcanization of rubber. Specific examples of the peroxide include dialkyl peroxides such as di-tert-butyl peroxide, tert-butylcumyl peroxide, dicumyl peroxide, $\alpha,\alpha$-bis(tert-butylperoxyisopropyl)benzene, 2,5-dimethyl-2,5-di(tert-butylperoxy)hexane, 2,5-dimethyl-2,5-di(tert-butyl-peroxy)hexyne and the like, as well as peroxyketals such as 1,1-bis(tert-butylperoxy)-3,3,5-trimethylcyclohexane, 2,2-bis(tert-butylperoxy)octane, n-butyl bis(tert-butylperoxy)valerate and the like. Of these, dialkyl peroxides are preferable in view of the properties of vulcanized rubber compound.

The form of the peroxide used is not particularly restricted and can be a peroxide form or a mixture with an impregnating agent.

The amount of the peroxide used is 0.5–10 parts by weight, preferably 1–4 parts by weight per 100 parts by weight of the adherend, i.e. the nitrile group-containing highly saturated copolymer rubber.

The conditions for bonding the polyester fiber and the nitrile rubber-containing highly saturated copolymer rubber by vulcanization are not particularly restricted and can be the same as conventionally used in the bonding of a rubber and a fiber by vulcanizing with a peroxide vulcanizing system. The bonding by vulcanization of polyester fiber and nitrile group-containing highly saturated copolymer rubber can be achieved specifically by adding to said rubber a peroxide vulcanizing agent and compounding agents such as filler and the like to prepare a rubber compound, embedding a polyester fiber into the rubber compound, and vulcanizing the resulting system. The conditions of vulcanization are usually 130°–180° C. for 1–120 minutes under an applied pressure of 0.5–10 MPa.

The composite between polyester fiber and nitrile group-containing highly saturated copolymer rubber of low iodine value, obtained by the process of the present invention is excellent in initial adhesion strength and heat-resistant adhesion strength, and accordingly is suited for use in timing belts, polyribbed belts, etc.

The present invention is described more specifically below with reference to Examples. In the following Examples and Comparative Example, parts and % are by weight unless otherwise specified.

PREPARATION OF LATEX (A)

Into an autoclave provided with a stirrer were fed 100 parts of a monomer mixture shown in Table 1, 150 parts of water, 0.1 part of tetrasodium ethylenediaminetetraacetate, 5 parts of sodium lauryl sulfate, 0.5 part of sodium hydrogencarbonate, 0.5 part of tert-dodecyl mercaptan and 0.3 part of potassium persulfate. The mixture was subjected to a reaction at 60° C. with stirring. When the polymerization conversion reached 95%, 0.05 part of hydroquinone was added to terminate the polymerization. The polymerization system was made vacuum to remove the unreacted monomers to obtain latexes A-1 to A-5.

PREPARATION OF ADHESIVE COMPOSITION (AR)

In 333.5 parts of water were dissolved 16.6 parts of resorcinol, 14.6 parts of an aqueous formaldehyde solution (formaldehyde concentration: 37%) and 1.3 parts of sodium hydroxide. The mixture was subjected to a reaction at 25° C. for 2 hours with stirring. To the resulting solution was added 100 parts of the latex (A-1), and the mixture was subjected to a reaction at 25° C. for 20 hours with stirring. Then, 80 parts of Vulcabond E (a product of Vulnax Co.) was added to the resulting mixture. The resulting aqueous solution was adjusted to a solid content of 20% to obtain an adhesive composition (AR-1).

In the same manner there were obtained adhesive compositions (AR-2) to (AR-5) corresponding to the latexes (A-2) to (A-5), respectively.

TABLE 1

| Latex No. | Composition of monomer mixture | | | | |
|---|---|---|---|---|---|
| | A-1 | A-2 | A-3 | A-4 | A-5 |
| Butadiene | 59 | 57 | 55 | 45 | 32 |
| 2-Vinylpyridine | 26 | 28 | 30 | 55 | 68 |
| Styrene | 15 | 15 | 15 | — | — |

PREPARATION OF LATEX (B) BY EMULSION POLYMERIZATION

In a 1-liter pressure bottle were placed 240 parts of water, 4 parts of potassium oleate and 37 parts of acrylonitrile in this order. The bottle inside was purged with nitrogen gas, and 63 parts of butadiene was introduced thereinto under pressure. The bottle was then placed in a water bath of constant temperature, and after 0.25 part of ammonium persulfate (a catalyst) had been added, the bottle contents were subjected to a polymerization for 16 hours to obtain a latex of an acrylonitrile-butadiene copolymer (hereinafter referred to as NBR) having a bound acrylonitrile content of 37% by weight. Then, the solid content of the latex was adjusted to 12%. 400 ml of the resulting latex was placed in a 1-liter autoclave provided with a stirrer. Nitrogen gas was passed through the latex for 10 minutes to remove the dissolved oxygen in the latex. Thereafter, a solution of palladium acetate as a hydrogenation catalyst dissolved in 240 ml of acetone was added. The atmosphere in the autoclave was purged with hydrogen gas two times, after which the hydrogen gas pressure in the autoclave was increased to 30 atm. The autoclave contents were heated to 50° C. and subjected to a reaction for 6 hours with stirring. The reaction mixture was cooled to room temperature; excessive hydrogen was removed by purging; from the resulting latex was removed the organic solvent by an evaporator; and concentration was effected until a solid content of about 40% was reached; thereby, a highly saturated NBR latex B-1 having an iodine value of 28 was obtained.

Highly saturated NBR latexes B-2 and B-3 of different iodine values were obtained in the same manner as above except that the hydrogenation conditions were changed. The properties of these latexes are shown in Table 2.

TABLE 2

| Latex No. | B-1 | B-2 | B-3 |
|---|---|---|---|
| Iodine value | 28 | 11 | 108 |
| Average particle diameter (μ) | 0.10 | 0.11 | 0.10 |
| Solid content (%) | 39.9 | 40.1 | 40.0 |
| PH | 10.6 | 10.8 | 10.7 |

PREPARATION OF ADHESIVE COMPOSITION (BR)

In 238.5 parts of water were dissolved 11 parts of resorcinol, 16.2 parts of an aqueous formaldehyde solution (formaldehyde concentration: 37%) and 0.3 part of sodium hydroxide. The mixture was subjected to a reaction at 25° C. for 6 hours with stirring. To the reaction mixture were added 100 parts of the latex (B-1), 22.6 parts of ammonia water (ammonia concentration: 14%) and 47.9 parts of water. The mixture was subjected to a reaction at 25° C. for 20 hours with stirring, to obtain an adhesive composition (BR-1).

In the same manner there were obtained adhesive compositions (BR-2) and (BR-3) corresponding to the latexes (B-2) and (B-3), respectively. [Preparation of rubber compound]

A nitrile group-containing highly saturated copolymer rubber and compounding agents were kneaded on rolls according to the compounding recipe shown in Table 3, to prepare rubber compound sheets having a thickness of about 2.5 mm.

TABLE 3

| Compounding recipe | I | II | III | IV | V |
|---|---|---|---|---|---|
| Zetpol 2000[1] | 100 | 100 | 100 | 100 | 100 |
| Zinc oxide No. 1 | 5 | 5 | 5 | 5 | 5 |
| Stearic acid | 1 | 1 | 1 | 1 | 1 |
| SRF carbon black | 40 | 40 | 40 | 40 | 40 |
| PEROXIMON F-40[2] | 6 | | | | |
| PERCUMYL D-40[3] | | 6 | | | |
| PERHEXA 2,5 B-40[4] | | | 6 | | |
| PERHEXYNE 2,5 B-40[5] | | | | 6 | |
| Sulfur | | | | | 0.5 |
| Tetramethylthiuram disulfide | | | | | 1.5 |
| 2-Mercapto-benzothiazole | | | | | 0.5 |

[1]A nitrile group-containing highly saturated copolymer rubber produced by Nippon Zeon Co., Ltd.: iodine value = 4, bound acrylonitrile content = 36%
[2]α,α-Bis(tert-butylperoxyisopropyl)benzene
[3]Dicumyl peroxide
[4]2,5-Dimethyl-2,5-di(tert-butylperoxy)hexane
[5]2,5-Dimethyl-2,5-di(tert-butylperoxy)hexyne
[The compounds [2] to [5] are products of NIPPON OIL & FATS CO., LTD.]

EXAMPLE 1

A polyester cord (structure: 1100/2×3) was dipped in the adhesive composition (AR-3) using a single cord dipping machine for test purpose, and then heated at 245° C. for 1 minute. The resulting cord was dipped in the adhesive composition (BR-2) and then heated at 245° C. for 1 minute.

The thus treated polyester cord was embedded into the rubber compound of Table 3 prepared according to the compounding recipe I at an embedding width of 25 mm. The resulting system was vulcanized at a press pressure of 5 MPa at 150° C. for 30 minutes, to obtain a fiber-rubber composite.

The composite was measured for initial adhesion strength by conducting a cord peeling test in accordance with ASTM D 2630. The composite prepared in the same manner as above was measured for heat-resistant adhesion strength by conducting a cord peeling test after heat-treating the composite at 120° C. for 168 hours in an air oven. The results are shown in Table 4.

COMPARATIVE EXAMPLE 1

Composites were prepared in the same manner as in Example 1 except that the compounding recipe I was changed to the compounding recipe V. The composites were measured for initial adhesion strength and heat-resistant adhesion strength in the same manners as in Example 1. The results are shown in Table 4.

TABLE 4

| Test No. | Example 1<br>1 | Comparative Example 1<br>2 |
|---|---|---|
| Compounding recipe | I | V |
| Initial adhesion strength (kg/25 mm) | 20.8 | 17.8 |
| Heat-resistant adhesion strength (kg/25 mm) | 16.2 | 14.0 |

As is clear from the results of Table 4, a composite excellent in initial adhesion strength and heat-resistant adhesion strength can be obtained when a peroxide vulcanizing system is used, while the use of a sulfur vulcanizing system gives a composite poor in initial adhesion strength and heat-resistant adhesion strength.

EXAMPLE 2

Composites were prepared in the same manner as in Example 1 except that the compounding recipe I was changed to the compounding recipes II to IV of Table 3. The composites were measured for initial adhesion strength and heat-resistant adhesion strength in the same manners as in Example 1. The results are shown in Table 5.

TABLE 5

| | Example 2 | | |
|---|---|---|---|
| Test No. | 3 | 4 | 5 |
| Compounding recipe | II | III | IV |
| Initial adhesion strength (kg/25 mm) | 20.2 | 20.4 | 22.4 |
| Heat-resistant adhesion strength (kg/25 mm) | 16.1 | 16.6 | 17.8 |

As is clear from the results of Table 5, the use of different peroxide vulcanizing systems gives composites each excellent in initial adhesion strength and heat-resistant adhesion strength as long as the peroxide vulcanizing systems are those conforming to the present invention.

EXAMPLE 3

Composites were prepared in the same manner as in Example 1 except that there were combined the two adhesive compositions shown in Table 6. The composites were measured for initial adhesion strength and heat-resistant adhesion strength in the same manners in Example 1. The results are shown in Table 6.

TABLE 6

| | Example 3 | | | | |
|---|---|---|---|---|---|
| Test No. | 7 | 8 | 9 | 10 | 11 |
| Adhesive composition (AR) | AR-1 | AR-2 | AR-3 | AR-4 | AR-5 |
| Adhesive composition (BR) | BR-2 | BR-2 | BR-1 | BR-2 | BR-2 |
| Initial adhesion strength (kg/25 mm) | 20.6 | 20.7 | 20.5 | 20.3 | 20.5 |
| Heat-resistant adhesion strength (kg/25 mm) | 14.7 | 16.8 | 14.9 | 17.6 | 18.1 |

We claim:

1. A process for producing a polyester fiber-rubber composite comprising
    contacting a polyester fiber composed mainly of polyethylene terephthalate with (1) an adhesive composition (AR) consisting mainly of a latex (A) of a vinylpyridine-conjugated diene type copolymer containing a vinylpyridine unit in an amount of not less than 20% by weight but not more than 70% by weight and a resorcinol-formaldehyde resin and
    then contacting the fiber with (2) an adhesive composition (BR) consisting mainly of a latex (B) of a nitrile group-containing highly saturated copolymer rubber having an iodine value of 120 or less obtained by emulsion polymerization or by emulsion polymerization followed by hydrogenation in the emulsion state and a resorcinol-formaldehyde resin,
    contacting the thus treated fiber with a nitrile group-containing highly saturated copolymer rubber having an iodine value of 20 or less, and
    embedding the treated polyester fiber in the nitrile group-containing highly saturated copolymer rubber and
    bonding said polyester fiber and said copolymer rubber by vulcanizing the copolymer rubber with a peroxide vulcanizing system.

2. The process for producing a polyester fiber-rubber composite according to claim 1, wherein the copolymer constituting the latex (A) of a vinylpyridine-conjugated diene type copolymer contains a vinylpyridine unit in an amount of 20–70% by weight, a conjugated diene unit in an amount of 30–80% by weight and unit(s) of other monomer(s) copolymerizable with the vinylpyridine and the conjugated diene in amount(s) of 0–40% by weight.

3. The process for producing a polyester fiber-rubber composite according to claim 2, wherein the unit of other monomer is a styrene unit.

4. The process for producing a polyester fiber-rubber composite according to claim 1, wherein the copolymer constituting the latex (B) of a nitrile group-containing highly saturated copolymer rubber has an iodine value of 100 or less.

5. The process for producing a polyester fiber-rubber composite according to claim 1, wherein the latex (B) of a nitrile group-containing highly saturated copolymer rubber is a latex of a nitrile group-containing highly saturated copolymer rubber containing α,β-ethylenically unsaturated nitrile unit in an amount of 10-50% by weight.

6. The process for producing a polyester fiber-rubber composite according to claim 4 or 5, wherein the latex (B) of a nitrile group-containing highly saturated copolymer rubber is obtained by preparing, by emulsion polymerization, a latex of a nitrile group-containing copolymer rubber having an iodine value of 120 or more and then hydrogenating the latex.

7. The process for producing a polyester fiber-rubber composite according to claim 1, wherein the amount (as dried) of the resorcinol-formaldehyde resin used in the adhesive composition (AR) is 10-180 parts by weight per 100 parts by weight (as solid) of the latex (A) and the amount (as dried) of the resorcinol-formaldehyde resin used in the adhesive composition (BR) is 10-180 parts by weight per 100 parts by weight (as solid) of the latex (B).

8. The process for producing a polyester fiber-rubber composite according to claim 1, wherein the total amount (as solid) of the adhesive compositions adhered to the polyester fiber is 2-20% by weight based on the polyester.

9. The process for producing a fiber-rubber composite according to claim 1, wherein the ratio of the amount (as solid) of the adhesive composition (AR) to the amount (as solid) of the adhesive composition (BR) is 50:50 to 80:20.

10. The process for producing a polyester fiber-rubber composite according to claim 1, wherein the amount of the peroxide vulcanizing system used is 0.5-10 parts by weight per 100 parts by weight of the nitrile group-containing highly saturated copolymer rubber as an adherend.

11. The process for producing a polyester fiber-rubber composite according to claim 1, wherein the peroxide vulcanizing system is a dialkyl peroxide.

12. The process for producing the polyester fiber-rubber composite of claim 1, wherein the polyester fiber comprises polyethylene terephthalate.

13. A process for producing a polyester fiber-rubber composite comprising
contacting a polyester fiber composed mainly of polyethylene terephthalate with (1) an adhesive composition (AR) consisting mainly of a latex (A) of a vinylpyridine-conjugated diene type copolymer containing a vinylpyridine unit in an amount of 25-60% by weight and a conjugated diene unit in an amount of 40-75% by weight and a resorcinol-formaldehyde resin and
then contacting the fiber with (2) an adhesive composition (BR) consisting mainly of a latex (B) of a nitrile group-containing highly saturated copolymer rubber having an iodine value of 120 or less obtained by emulsion polymerization or by emulsion polymerization followed by hydrogenation in the emulsion state and a resorcinol-formaldehyde resin,
contacting the thus treated fiber with a nitrile group-containing highly saturated copolymer rubber having an iodine value of 20 or less, and
embedding the treated polyester fiber in the nitrile group-containing highly saturated copolymer rubber and
bonding said polyester fiber and said copolymer rubber by vulcanizing the copolymer rubber with a peroxide vulcanizing system.

14. The process for producing a polyester fiber-rubber composite according to claim 13, wherein the amount (as dried) of the resorcinol-formaldehyde resin used in the adhesive composition (AR) is 10-180 parts by weight per 100 parts by weight (as solid) of the latex (A) and the amount of the resorcinol-formaldehyde resin used in the adhesive composition (BR) is 10-180 parts by weight per 100 parts by weight (as solid) of the latex (B).

15. The process for producing a polyester fiber-rubber composite according to claim 13, wherein the ratio of the amount (as solid) of the adhesive composition (AR) to the amount (as solid) of the adhesive composition (BR) is 50:50 to 80:20.

* * * * *